(12) United States Patent
Maddux

(10) Patent No.: US 6,529,148 B1
(45) Date of Patent: Mar. 4, 2003

(54) APPARATUS AND METHOD FOR ACQUISITION OF AN INCOMING DATA STREAM

(75) Inventor: John T. Maddux, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/095,589

(22) Filed: Mar. 11, 2002

(51) Int. Cl.[7] .................................................. H03M 9/00
(52) U.S. Cl. ...................................... 341/100; 341/101
(58) Field of Search ........................... 341/100, 79, 101, 341/110

(56) References Cited

U.S. PATENT DOCUMENTS 6,420,981 B1 * 7/2002 Yu .............................. 341/100

* cited by examiner

Primary Examiner—Brian Young
(74) Attorney, Agent, or Firm—Blakely, Sokoloff, Taylor & Zafman LLP

(57) ABSTRACT

In general, one embodiment of the invention involves an apparatus that comprises a fast acquisition logic coupled to an oversampler. The fast acquisition logic is configured to detect whether any of a plurality of data samples produced by the oversampler is inaccurate, and if so, to cause data to be recovered from a new data sample different from the data sample previously being used for data recovery. The new data sample would be multiple sampling states away from the previous data sample.

24 Claims, 5 Drawing Sheets

| | PREVIOUS CYCLE | | | | | | CURRENT CYCLE | | | | | |
|---|---|---|---|---|---|---|---|---|---|---|---|---|
| CURRENT STATE | d1⊕d2 | d2⊕d3 | d3⊕d4 | d4⊕d5 | d5⊕d6 | d6⊕d1 | d1⊕d2 | d2⊕d3 | d3⊕d4 | d4⊕d5 | d5⊕d6 | d6⊕d1 |
| S4 | s4 | s5 | s5 | s5/3 | s3 | s3 | s4 | | | | | |
| S5 | | s5 | s6 | s6 | s6/4 | s4 | s4 | s5 | | | | |
| S6 | | | s6 | s1 | s1 | s1/5 | s5 | s5 | s6 | | | |
| S1 | | | | s1 | s2 | s2 | s2/6 | s6 | s6 | s1 | | |
| S2 | | | | | s2 | s3 | s3 | s3/1 | s1 | s1 | s2 | |
| S3 | | | | | | s3 | s4 | s4 | s4/2 | s2 | s2 | s3 |

FIG. 4

APPARATUS AND METHOD FOR ACQUISITION OF AN INCOMING DATA STREAM

FIELD

An embodiment of the invention relates to the field of serial communications, and in particular, an apparatus and method for recovering data from a serial data stream.

BACKGROUND

Serial interfaces operating in accordance with Universal Serial Bus (USB) or Serial Advanced Technology Attachment (Serial-ATA) communication protocols are adapted to extract data from an incoming serial data stream. In order to minimize data loss and avoid a connection failure, serial interface logic must quickly "lock on" to the incoming data stream by detecting the center of each data bit signal. The center of each data bit signal, when oversampled, is usually the sample located at or around the midpoint between signal edges. However, such detection may be difficult due to the presence of timing variations such as jitter or frequency offsets.

For instance, when a serial interface starts receiving a data stream after an idle condition, it has no history to guide it in determining which data sample to select. In the absence of jitter, the edge would consistently be detected at the same sampled location. But with the presence of jitter, however, the location of these edges may vary over time, in some cases across approximately one-half of the number of sample locations.

As previously mentioned, at the start of the incoming serial stream, only a few edges will be received before the serial interface is required to be locked onto the incoming data stream. For example, the "Universal Serial Bus Specification Version 2.0" (published Apr. 27, 2000) allows for only seven (7) edges before the serial interface is required to lock onto the incoming stream and guarantee receipt of the correct data. One clear problem is that if a large amount of jitter is present in the data stream, but only a few edges are received, it is statistically possible that the edges received are at either extreme of the possible edge locations. Hence, it may be quite difficult for the serial interface to detect the edges of the incoming data stream or at least converge to the appropriate locations for such edges. A lack of such detection or convergence may cause the serial communication session to accidentally fail.

BRIEF DESCRIPTION OF THE DRAWINGS

FIG. 4 is an exemplary embodiment of a state table of the decision matrix logic of FIG. 2.

DETAILED DESCRIPTION

In general, one embodiment of the invention relates to an apparatus and method for quickly recovering data at the start of an incoming serial data stream. For one embodiment, the apparatus features fast acquisition logic adapted to detect inaccurate data samples recovered from the data stream and to adjust a next state pointer output by decision matrix logic described below. This adjustment may involve multiple state transitions in a single cycle from a current sampling state to a sampling state generally opposite the current sampling state. Thus, a data sample closer to the center of the data bit signal may now be selected for data retrieval. This improves the accuracy of data recovered from an incoming serial data stream.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe certain features of embodiments of the invention. For example, a "computing device" may be any electronic product having a serial interface such as, for example, consumer electronics (e.g., computer, digital camera, printer, modem, personal digital assistant "PDA", cellular telephone, etc.); set-top box; a network switching device (e.g., router, bridge or brouter) or the like. The serial interface may be configured in accordance with any serial communication protocol such as Universal Serial Bus (USB), Serial-ATA, Infiniband, Third Generation I/O (3GIO), Ethernet or the like.

The computing device comprises internal logic, namely hardware, firmware, software module(s) or any combination thereof. When logic is implemented as a software module, it is a series of instructions that, when executed, perform a certain function. Examples of a "software module" include, for example, an operating system, an application, an applet, a program or even a routine. One or more software modules may be stored in a machine-readable medium, which includes but is not limited to an electronic circuit, a semiconductor memory device, a read only memory (ROM), a flash memory, a type of erasable programmable ROM (EPROM or EEPROM), a floppy diskette, a compact disk, an optical disk, a hard disk, or the like.

Figure 1:
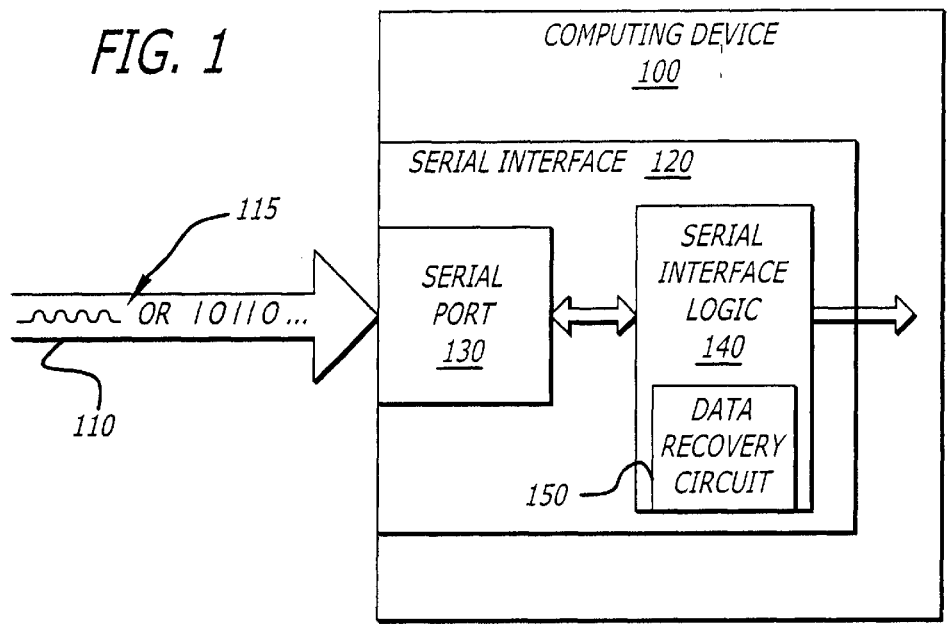
FIG. 1 is an exemplary embodiment of a computing device adapted with an embodiment of the invention.

Referring now to FIG. 1, an exemplary embodiment of a computing device 100 employing an embodiment of the invention is shown. The computing device 100 comprises a serial interface 120 adapted for connection to a link 110. Configured to support serial data propagation, link 110 may include, but is not limited to a cable, a bus trace, one or more electrical wires, optical fiber, or even wireless circuitry in combination with air.

As shown for this embodiment, serial interface 120 comprises a serial port 130 in communication with serial interface logic 140. Adapted with any pin or socket configuration, serial port 130 operates a conduit in supporting serial transmissions by receiving an incoming serial data stream 115 over link 110 and providing such data to serial interface logic 140.

The serial interface logic 140 is responsible for detecting a serial communication session and processing data associated with that session. A serial communication session is the transmission of multiple data bit signals in serial succession (referred to as a "serial bit stream"). For one embodiment, the communication session has ended upon detecting an inactive DATA_VALID signal accompanying the data bit signals. Of course, other detection means may be employed.

Data processing by the serial interface logic 140 may involve demodulating the incoming serial data if such data is modulated. Alternatively, serial interface logic 140 may decode the incoming serial data if such data is encoded. Herein, for this embodiment, serial interface logic 140 includes data recovery logic 150 as shown in FIG. 2.

Figure 2:
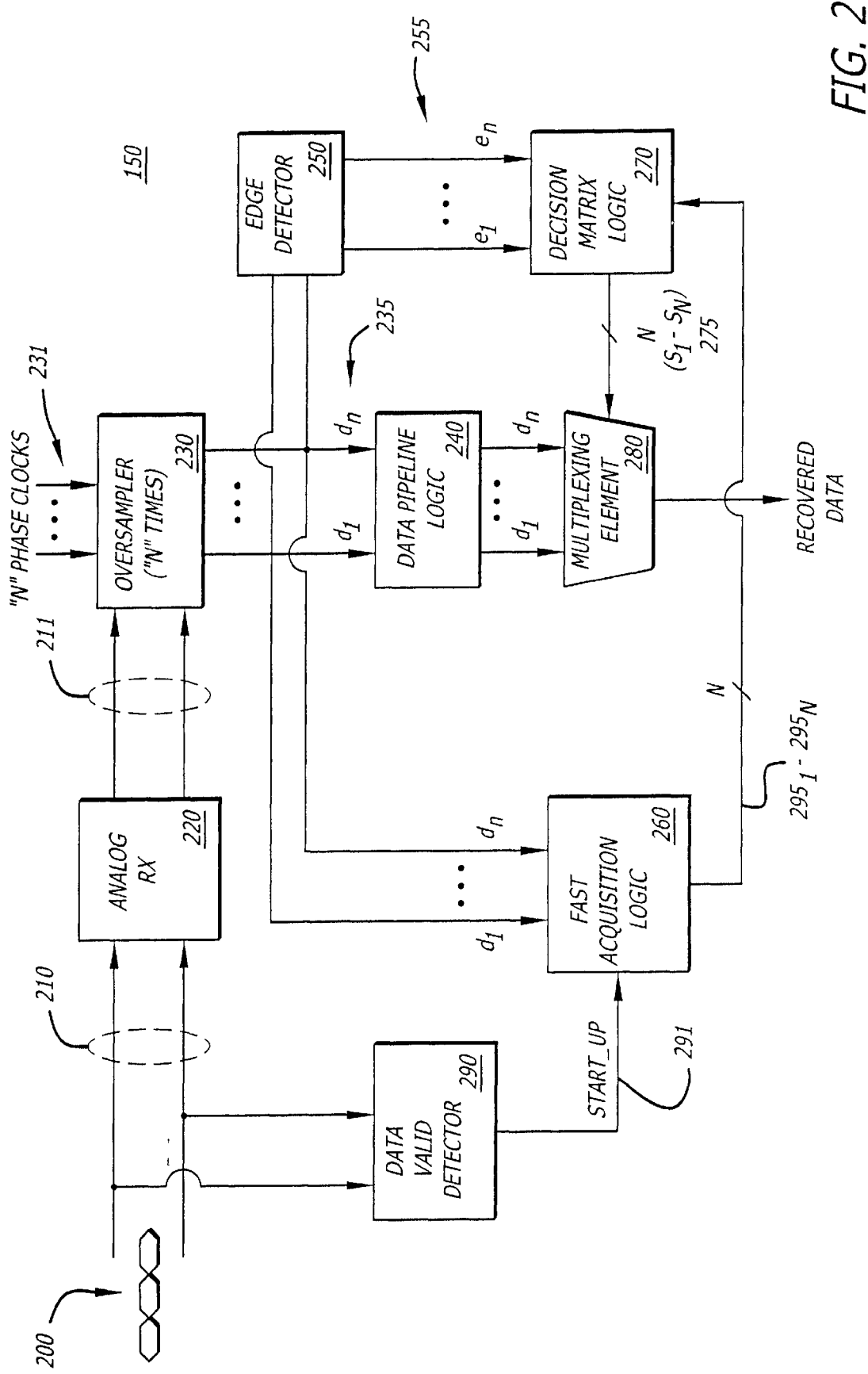
FIG. 2 is an exemplary embodiment of a data recovery logic according to the invention.

Referring now to FIG. 2, an exemplary embodiment of the data recovery logic 150 of FIG. 1 is shown. The data recovery logic 150 receives an incoming data stream 200, namely a series of data bits having either a logic "High" (1) value or logic "Low" (0) value. The parameters as to what constitutes a logic "High" or "Low" value are design specific. For example, in one implementation, a bit signal with a logic "High" value has at a measured voltage greater than a determined voltage level. The logic "Low" value is less than the determined voltage. In another implementation, a bit signal with an absolute (+/−) voltage greater than a determined value is considered to be logic "High". In the event the bit signal has an associate voltage less than the determined value, it would be considered logic "Low." There are many other voltage logic levels that may be used besides those set forth above for illustrative purposes.

The serial data stream 200 is routed over link 210 to optional analog receiver logic 220. The links 210 and 211 may be singular in nature, or perhaps dual if supporting differential signaling as shown. The analog receiver logic 220 performs amplification on the incoming data 200. Such amplification may include gain adjustment and common mode rejection. The amplified serial data is routed via link 211 to an oversampler 230, namely logic that uses clock phase oversampling to track the incoming serial data stream and to conduct multiple samples on each data bit signal of that data stream.

For this embodiment, the oversampler 230 conducts "N" (N>1) samples over a time period for the data bit signal, based on the "N" clock signals 231 provided to the oversampler 230. Each of these "N" clock signals 231 are at different phases so that data is sampled at a rate faster than the data rate. The resultant "N" data samples $(d_1-d_N)$ 235 are provided to data pipeline logic 240, which provides sufficient delay to enable proper analysis of the data samples 235.

Additionally, the data samples $(d_1-d_N)$ 235 are routed to edge detector logic 250 and fast acquisition logic 260. The edge detector logic 250 attempts to determine the edge locations of each data bit signal. One technique for edge location detection involves the Exclusive OR'ing (XOR'ing) of adjacent data samples where data sample $d_i$ is separately XORed with data sample $d_{i+1}$, and data sample $d_{i-1}$. For instance, data sample $d_1$ is XOR'ed with data sample $d_2$ ($d_1 \oplus d_2$) and data sample $d_N$ ($d_1 \oplus d_N$). Data sample $d_3$ is XOR'ed with data sample $d_2$ ($d_3 \oplus d_2$) and data $d_4$ ($d_3 \oplus d_4$). When the edge detector logic 250 computes the XOR results for both adjacent data samples ($d_i \oplus d_{i-1}$) and ($d_i \oplus d_{i+1}$) and such results are equal to "1", it has detected an apparent edge of the data bit signal at a location associated with data sample $d_i$. These XOR operations may be conducted in a concurrent manner or in a sequential manner. Of course, the edge detector logic 250 may use any number of edge detection techniques other than Exclusive OR.

Figure 3:
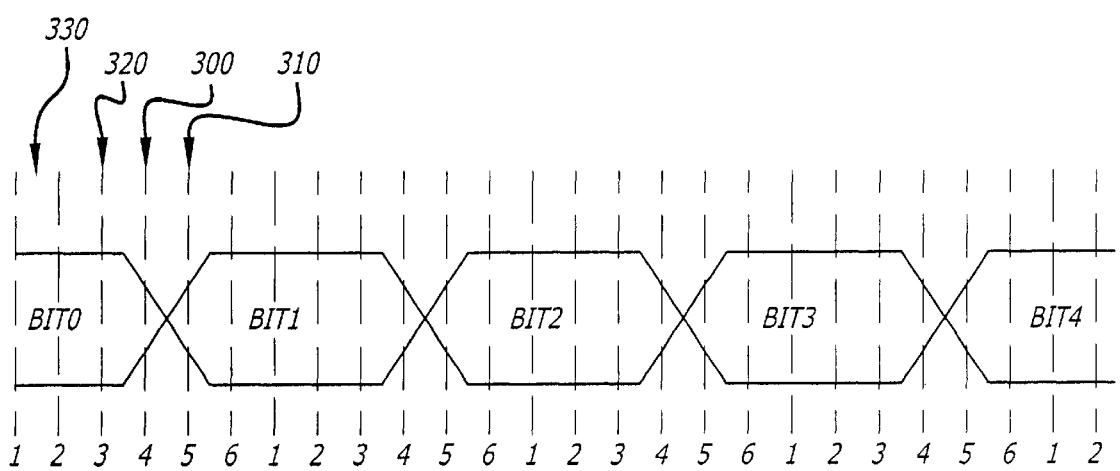
FIG. 3 is an exemplary embodiment of sampling phases of a portion of the incoming data stream received by the data recovery logic of FIG. 2.

As shown in FIG. 3, for this embodiment, it is noted that the XOR result of data sample $d_4$ 300 with data sample $d_5$ 310 will generate a value equal to "1". Thus, the edge would be considered to be between data samples $d_4$ & $d_5$ 300 and 310 of each data bit signal 330. However, with the presence of timing variations such as jitter, the edges associated with sampled data locations may vary.

Referring back to FIG. 2, the detected edge locations $(e_1-e_N)$ 255 computed by edge detector logic 250 are used to select which of the data samples $(d_1-d_N)$ is closest to the center of the data bit—the "best" sample for recovering data from the serial data stream. In particular, decision matrix logic 270 receives the detected edge locations $(e_1-e_N)$ 255, and in response, outputs a single state variable $(s_1, \ldots, s_N)$ 275, to a multiplexing element 280 (e.g., one or more multiplexers) This state variable $(s_1, \ldots, s_N)$ 275, hereinafter referred to as the "state pointer," controls which data sample $(d_1, \ldots, d_N)$ considered to be the best sample is output by the multiplexing element 280.

For this embodiment, activation of the state pointer $s_1$ indicates that the data sample $d_1$ is the best sample. Activation of state pointer $s_2$ indicates that data sample $d_2$ is the best sample and so on. However, in lieu of state pointers $(s_1-s_n)$ corresponding in number to the data samples $(d_1-d_n)$, it is contemplated that combinations of state pointers may be used to select a particular data sample. Thus, the number of state pointers may vary (e.g., be less than from the number of data samples for an encoded state pointer mechanism).

For each cycle, edge detector logic 250 generates the location $(e_1-e_N)$ 255 where edges occur between the data samples. The decision matrix logic 270 uses current state pointer $s_1-s_n$ and edge locations $e_1-e_n$ of the current cycle (and perhaps the state pointer and/or edge locations of at least one previous cycle) in order to determine the next state pointer. Typically, the decision matrix logic 270 attempts to select the state pointer furthest from the edges.

Referring to FIG. 4, for 6× data sampling produced by oversampler 230, a decision matrix state table 400 in accordance with the selection of data samples of FIG. 3 for data recovery is shown. Herein, for example, if an edge location is determined between samples $d_1$ and $d_2$ ($d_1 \oplus d_2=1$) and the current state is $s_4$, the next state is $s_4$. Likewise, $s_5$ transitions to $s_4$; $s_6$ to $s_5$; $s_1$ to $s_2$ or $s_6$ ($s_2/s_6$); $s_2$ to $s_3$; and $s_3$ to $s_4$. Of course, the decision matrix logic 270 may use a histogram of all edges that have occurred over a period of time to determine appropriate activation of state selection signals or perhaps count the width of the bits in order to determine edge locations.

Referring back to FIG. 2, fast acquisition logic 260 receives data samples $d_1-d_N$ 235. If in an active state, fast acquisition logic 260 may adjust the state pointer $(s_1, \ldots, $ or $s_N)$ 275 provided by decision matrix logic 270.

Figure 6:
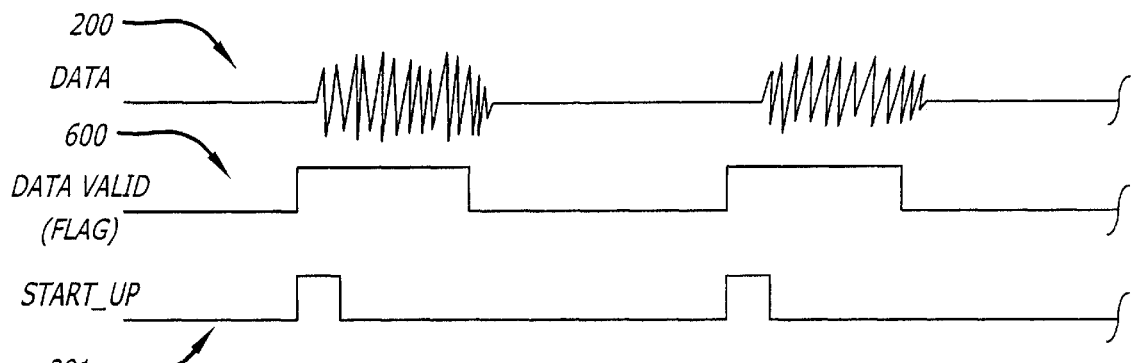
FIG. 6 is an exemplary embodiment of signaling processed by the data recovery logic of FIG. 2.

More specifically, the fast acquisition logic 260 is in communication with data valid detection logic 290, which provides a START_UP signal 291 to logic 260 when an initial incoming data stream of a communication session is received. Thus, the fast acquisition logic 260 is placed in an active state only at the start of a communication session. The start of the communication session may be detected by an active DATA_VALID signal 600 accompanying the serial data stream 200 as shown in FIG. 6. Otherwise, during most of the communication session especially after the data stream has been locked onto, the fast acquisition logic 260 normally remains in an inactive (Idle) state.

In one embodiment, the fast acquisition logic 260 compares data samples with a determined data pattern that is used at the start of every serial data transmission. This comparison quickly enables a determination of whether certain data has been sampled improperly, possibly within as little as 2 or 3 bits received.

Upon detecting one of the data samples having an incorrect value, fast acquisition logic 260 activates a corresponding sample error (S_ERR) link $295_1$–$295_N$, which indicates when a particular data sample has been incorrectly determined. The S_ERR links $295_1$–$295_N$ are routed to the decision matrix logic 270. Upon determining that a particular S_ERR link $295_1$, . . . , or $295_N$ has been activated, the decision matrix logic 270 may alter the state pointer ($s_1$, . . . , or $s_N$) 275 if that signal corresponds to the activated S_ERR link(s) $295_1$, . . . , $295_N$.

Figure 5:
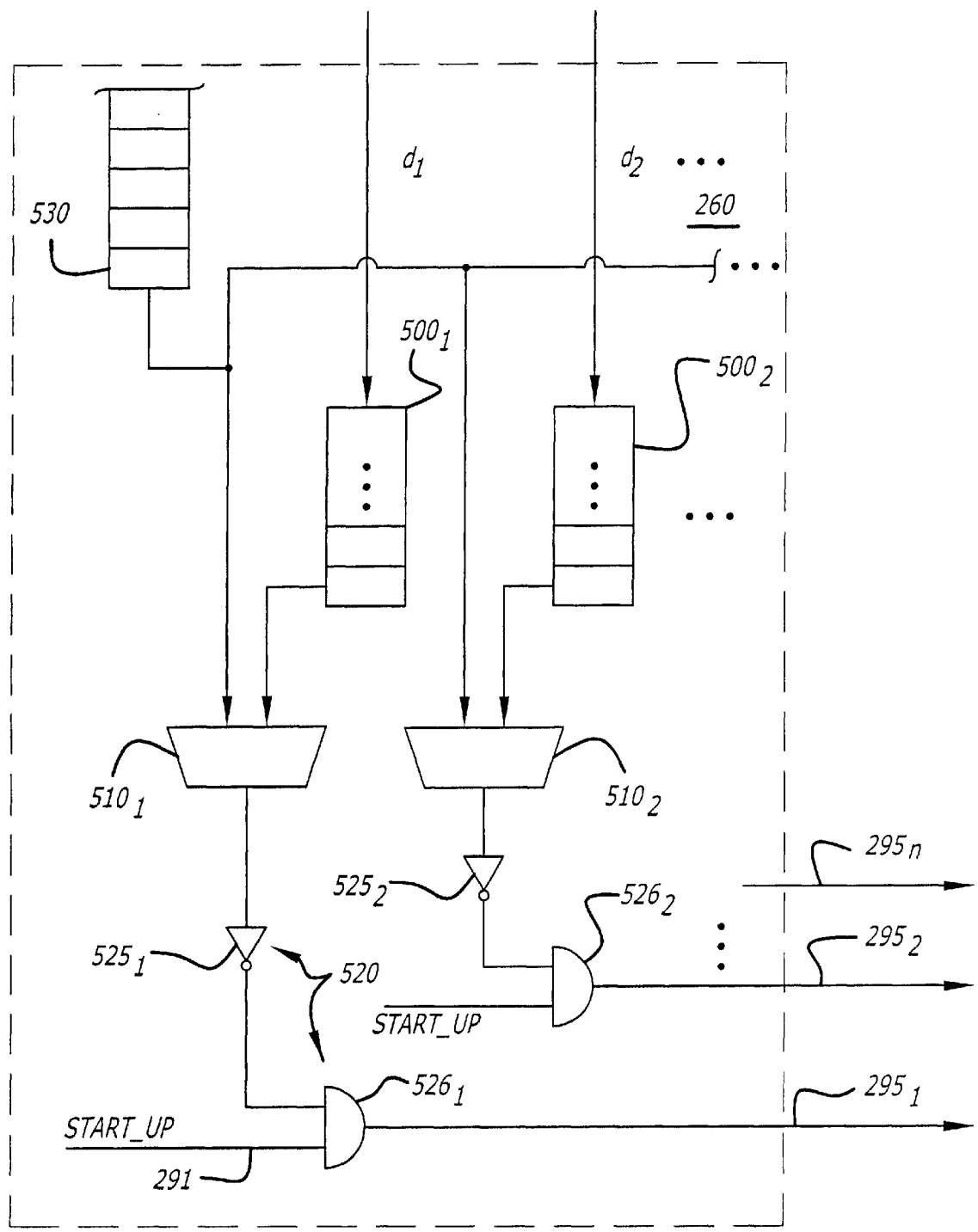
FIG. 5 is an exemplary embodiment of a fast acquisition logic of FIG. 2.

Referring now to FIG. 5, an exemplary embodiment of the fast acquisition logic 260 of FIG. 2 is shown. The fast acquisition logic 260 comprises a plurality of shift registers $500_1$–$500_N$, a plurality of comparators $510_1$–$510_N$ and combinatorial logic 520. The sampled data ($d_1$–$d_N$) 235 for each data bit signal is routed to a corresponding shift register $500_1$, . . . , $500_N$. The outputs of the shift registers $500_1$–$500_N$ are compared to a stored fixed pattern 530, arranged in accordance with the serial transmission specification.

In particular, for a data bit, an output of the shift register $500_1$ (data sample $d_1$) is compared to a bit value of the fixed pattern 530 using comparator $510_1$. If the values are equivalent, the combinatorial logic 520 (e.g., inverter $525_1$, and AND gate $526_1$) signals that the data sample $d_1$ is accurate (e.g., logic "Low" signal). Similar operations occur for the other data samples ($d_2$–$d_N$).

For this embodiment, if data sample $d_1$ is accurate, the output of the comparator $510_1$ is a logic "High" signal. But, this output signal is inverted by inverter $525_1$. Since the output from the data valid detection logic 290 of FIG. 2 is "High" during initial start-up phase (e.g., START_UP signal is set to be logic "High"), the sample error flag is inactive; namely, the signal routed over the sample error link $295_1$ is logic "Low." However, if data sample $d_1$ is inaccurate, comparator $510_1$ outputs a logic "Low" signal, which is inverted by inverter $525_1$. Thus, sample error flag is active (e.g., logic "High" signal is routed over link $295_1$).

Upon receiving an active sample error flag on data link $295_i$ (indicating that data sample $d_i$ is invalid) and state pointer $s_i$ is currently being output by decision matrix logic 270, the current state pointer $s_i$, based at least partially on the edge detector logic 250, is overwritten by the fast acquisition logic 260. This overwriting operation sets the next state pointer to a sampling state opposite the sampling state of the current state pointer. This "opposite state" is generally equivalent to the state of current state pointer plus N/2 sampling states (with wrap around $s_N$–$s_1$, as needed).

For instance, using FIG. 3 as an illustrative sampling, if the current state pointer is $s_4$ and sample data $d_4$ is flagged as an invalid sample, the fast acquisition logic 260 sends an active sample error flag to decision matrix logic 270 by sending a logic "High" signal over S_ERR link $295_4$. Upon receiving such information, the decision matrix logic 270 deactivates state pointer $s_4$ as the current state pointer and activates another state pointer associated with a different state.

In one embodiment, such as the data sampling scheme of FIGS. 2 and 3, the state selection would be made to an opposite state where if the current state pointer is $s_4$ for the 6x oversampler, the next state pointer selected would be $s_1$. Similarly, $s_5$ would go to $s_2$, $s_6$ would go to $s_3$, $s_1$ to $s_4$, $s_2$ to $s_5$ and $s_3$ to $s_6$. This effectively performs three state transitions in one cycle, moving the state pointer quickly away from a bad data sample location. By moving to a substantially different sampling state location, the data recovery logic 150 of FIG. 2 has a better chance of selecting a data sample associated with the center of the data bit signal and correctly recovering the incoming data. This fast acquisition processing is activated for only the first few data bits received and then disabled for the rest of the serial communication session.

Figure 7:
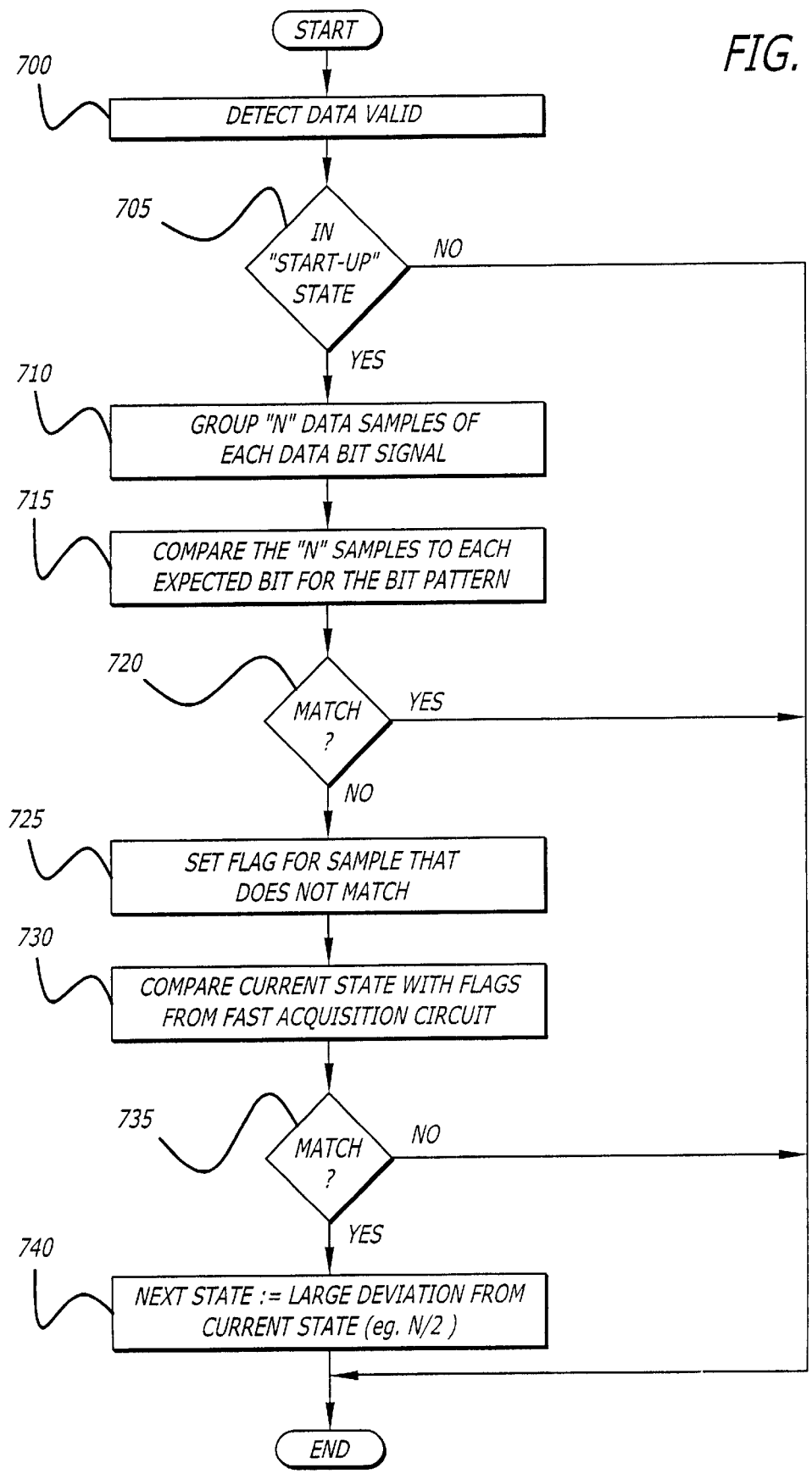
FIG. 7 is an exemplary flowchart of the operations of the fast acquisition logic of FIG. 5 operating in combination with the decision matrix logic of FIG. 2.

Referring to FIG. 7, an exemplary flowchart of the operations of the fast acquisition logic 260 of FIG. 5 is shown. Initially, the data recovery logic detects the presence of incoming data (block 700). For one embodiment, this may be accomplished by the presence of a DATA_VALID signal accompanying the serial data. Upon receiving serial data, a determination is made as to the current mode of operation of the serial interface (block 705). If the serial interface is operating in a "Start_Up" mode (e.g., an initial period of time immediately after the serial interface exits from its Idle mode), the fast acquisition logic is now operational. Otherwise, the fast acquisition logic remains inoperative.

To determine if data is being recovered accurately, a first sequence (N) of data samples is computed and compared to a first bit of an expected bit pattern for an incoming serial stream (blocks 710 and 715). This process is repeated for M incoming data bits forming the predefined data pattern located at the start of every data transmission, where "M" is greater than one.

If one of these samples does not match the expected bit value, a sample error flag corresponding to that sample is activated (blocks 720 and 725)). This flag may be represented by activation of the corresponding S_ERR link. Thereafter, a determination is made whether the current state pointer ($s_i$) output by the decision matrix logic corresponds to any flags set by the fast acquisition logic (blocks 730 and 735). If so, the next state pointer will deviate from the current state pointer (block 740). For example, for the data recovery logic of FIG. 2, if the current state pointer ($s_4$) is output by the decision matrix logic and its corresponding sample error flag is set, the next state pointer will be placed at a state equivalent to $s_4$ plus approximately N/2 state transitions for this embodiment. Thus, the next state pointer would undergo three state transitions, now being equivalent to $s_1$ for 6x oversampling. It is contemplated that the degree of state transitions may vary so that $$K\left(\frac{N}{2}\right)$$

transitions may occur (where "K"=any positive number not equal to "1").

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. An apparatus comprising:
   an oversampler to sample a data bit signal and output a plurality of data samples associated with the data bit signal;
   a multiplexer element coupled to the oversampler, the multiplexer element to output a first data sample of the plurality of data samples; and
   a fast acquisition logic coupled to the oversampler, the fast acquisition logic to detect whether any of the plurality of data samples is inaccurate, and if the first data sample is inaccurate, to cause a second data sample to be output from the multiplexer element.

2. The apparatus of claim 1 further comprising a decision matrix logic coupled to the multiplexer element and the fast acquisition logic, the decision matrix logic to control the output of the multiplexer element.

3. The apparatus of claim 2 further comprising an edge detector logic coupled to the oversampler, the edge detector logic to determine signal edges of the data bit signal.

4. The apparatus of claim 3, wherein the edge detector logic to exclusively OR (XOR) adjacent data samples of the plurality of data samples to determine the signal edges.

5. The apparatus of claim 3 further comprising a data valid detector logic coupled to a link transferring an incoming serial data stream to the oversampler, the incoming serial data stream including the data bit signal.

6. The apparatus of claim 5, wherein the fast acquisition logic includes a plurality of comparators to compare the plurality of data samples to a data pattern fixed in accordance with a serial transmission protocol supported by the apparatus.

7. The apparatus of claim 6, wherein an output of a first comparator of the plurality of comparators forming the fast acquisition logic is coupled input of an inverter having an output coupled to a first input of a logic gate with a second input of the logic gate being coupled to the data valid detector logic to output an active control signal upon detection of valid data over the link at a start of a communication session.

8. The apparatus of claim 5, wherein the link supports differential signaling.

9. The apparatus of claim 3 further comprising a data pipeline logic coupled to both the oversampler and the multiplexer element, the data pipeline logic to apply a delay to the plurality of data samples before being input into the multiplexer element.

10. An apparatus comprising:
an oversampler to sample an incoming data bit signal and produce a plurality of data samples associated with the data bit signal;
a multiplexer element in communication with the oversampler;
an edge detector logic coupled to the oversampler, the edge detector logic to determine signal edges of the data bit signal;
a decision matrix logic coupled to the multiplexer element and the edge detector logic, the decision matrix logic to control an output of the multiplexer element by providing a current state pointer to select a first data sample of the plurality of data samples to be output, the first data sample being a data sample furthest from the determined signal edges of the data bit signal; and
a fast acquisition logic coupled to the oversampler and the decision matrix logic, the fast acquisition logic to detect whether any of the plurality of data samples is inaccurate and to signal the decision matrix logic of an inaccurate data sample so that, in response, the decision matrix logic outputs a next state pointer to cause a second data sample to be output from the multiplexer element when the first data sample is one of the detected, inaccurate data samples.

11. The apparatus of claim 10, wherein the next state pointer output by the decision matrix logic selects the second data sample being at least two data samples removed from the first data sample.

12. The apparatus of claim 10, wherein the next state pointer being at a state opposite the current state pointer.

13. The apparatus of claim 12, wherein the next state pointer being approximately N/2 sampling state transitions removed from the current state pointer for an N-times oversampler.

14. The apparatus of claim 10 further comprising a data valid detector logic coupled to a link transferring an incoming serial data stream to the oversampler, the incoming serial data stream including the data bit signal.

15. A computer comprising:
a serial port to receive a serial data stream; and
a serial interface logic in communication with the serial port, the serial interface logic including a data recovery logic to detect a reliable location of data bit signal to accurately recover data associated with the data bit signal, the data recovery logic comprises
an oversampler to sample the data bit signal and output a plurality of data samples associated with the data bit signal,
a multiplexer element coupled to the oversampler, the multiplexer element to output a first data sample of the plurality of data samples, and
a fast acquisition logic in communication with the multiplexer element, the fast acquisition logic to detect whether the first data sample is inaccurate, and if so, to cause a second data sample to be output from the multiplexer element.

16. The computer of claim 15, wherein the data recovery logic of the serial interface logic further comprises a decision matrix logic coupled to the multiplexer element and the fast acquisition logic, the decision matrix logic to control the output of the multiplexer element.

17. The computer of claim 16, wherein the data recovery logic of the serial interface logic further comprises an edge detector logic coupled to the oversampler, the edge detector logic to determine signal edges of the data bit signal.

18. The computer of claim 17, wherein the edge detector logic to exclusively OR (XOR) adjacent data samples of the plurality of data samples to determine the signal edges.

19. The computer of claim 16, wherein the decision matrix logic to select the second data sample being approximately N/2 data samples from the first data sample.

20. The computer of claim 17, wherein the decision matrix logic to select the second data sample based on a sampling clock approximately 180 degrees out of phase from a sampling clock associated with the first data sample.

21. A method comprising:
conducting multiple samples a data bit signal of an incoming serial bit stream;
producing a plurality of data samples associated with the data bit signal;
selecting a first data sample of the plurality of data samples to recover data from the data bit signal;
detect whether the first data sample is inaccurate; and
selecting a second data sample if the first data sample is inaccurate, the second data sample being at a sampling state opposite a sampling state of the first data sample.

22. The method of claim 21, wherein each of the plurality of data samples is based on a sampling clock signal at a different phase so that data is sampled at a rate faster than a data rate of the incoming serial bit stream.

23. The method of claim 21, wherein the selecting of the first data sample comprises
detecting a location of signal edges of the data bit signal bordering two pairs of data samples of the plurality of data samples; and
selecting the first data sample of the plurality of data samples being furthest from the two pairs of data samples bordering the signal edge.

24. The method of claim 23, wherein the detecting of the location of the signal edges comprises performing exclusive OR operations between neighboring data samples.

* * * * *